Figure 3:
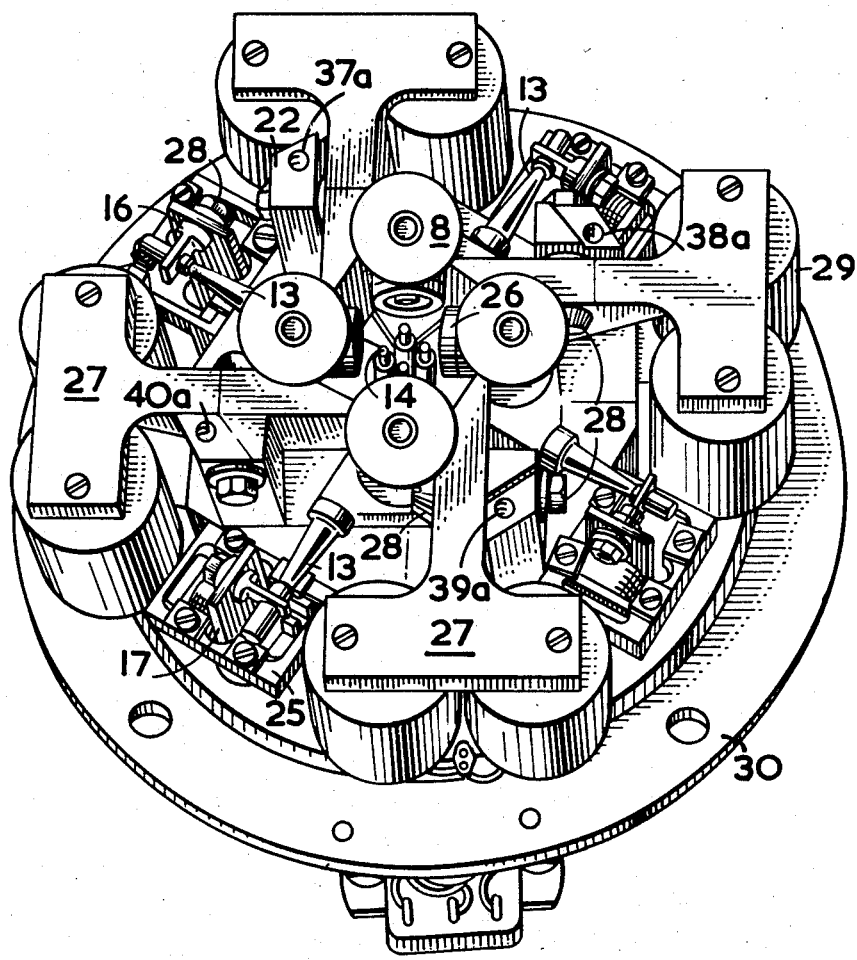

Jan. 13, 1959  S. BARCROFT  2,868,022
GYROSCOPIC APPARATUS
Filed Aug. 31, 1955  6 Sheets-Sheet 1
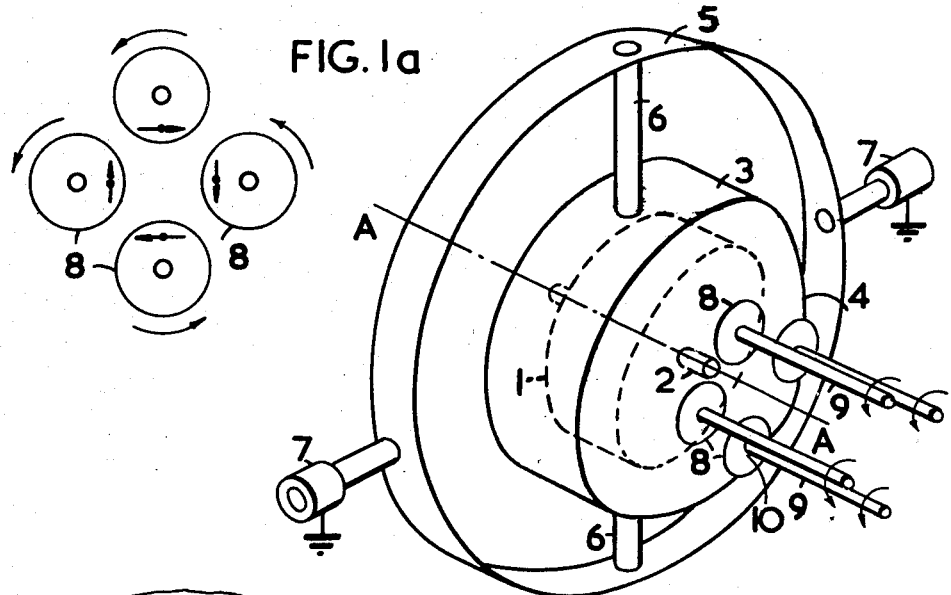
FIG. 1a
FIG. 1
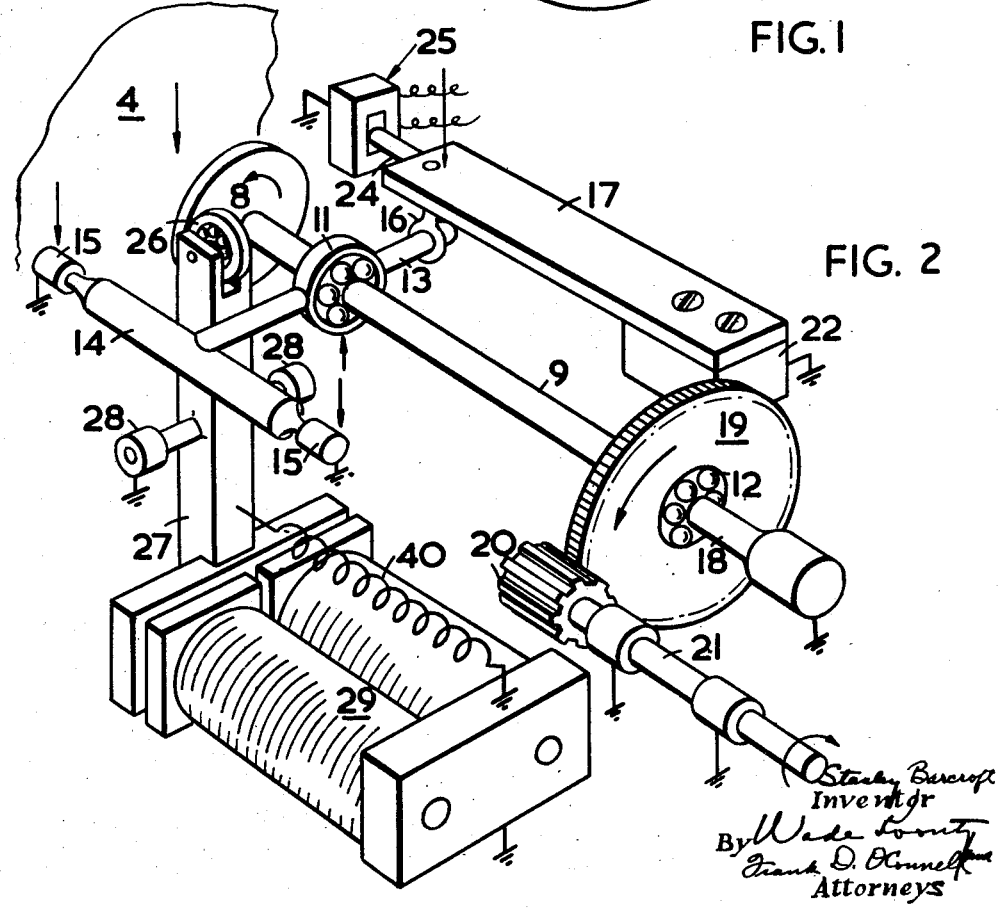
FIG. 2
Stanley Barcroft
Inventor
By Wade Loomis
Frank D. O'Connell
Attorneys Jan. 13, 1959   S. BARCROFT   2,868,022
GYROSCOPIC APPARATUS Filed Aug. 31, 1955   6 Sheets-Sheet 4

Stanley Barcroft
Inventor
By Wade Koontz and
Frank D. O'Connell
Attorneys

Jan. 13, 1959  S. BARCROFT  2,868,022
GYROSCOPIC APPARATUS
Filed Aug. 31, 1955  6 Sheets-Sheet 5

Jan. 13, 1959 S. BARCROFT 2,868,022
GYROSCOPIC APPARATUS
Filed Aug. 31, 1955 6 Sheets-Sheet 6

Stanley Barcroft
Inventor
By Wade Koontz
Frank D. O'Donnell
Attorneys

United States Patent Office
2,868,022
Patented Jan. 13, 1959

2,868,022

GYROSCOPIC APPARATUS

Stanley Barcroft, Farnborough, England, assignor to The Minister of Supply, in Her Majesty's Government of the United Kingdom of Great Britain and Northern Ireland, London, England Application August 31, 1955, Serial No. 531,636

12 Claims. (Cl. 74—5.4)

This invention relates to gyroscopes and in particular to means for precessing a gyroscope and measuring the precessing torques applied. It may be employed for example, in navigation apparatus of the kind in which the rate of change of angular position of a vehicle such as an aircraft, with respect to a fixed or moving datum or target has to be measured and with special advantage to what may be termed "directly coupled" apparatus which, again for example, may embody a radar scanner system of which the radar sight line is trained and held on a target by a "free" gyroscope directly coupled to it and controlled by the signals received from the scanner. In "directly coupled" apparatus, precession torques dependent on the signals are applied to the gyroscope to hold the sight line on the target and the magnitude of these torques may be considered as a measure of the rate of change of angular position of the sight line.

In the present invention, in order to precess a "free" gyroscope, a precession torque is applied by means of a continuously slipping friction clutch of which a rotary driving member, whose mounting is stationary relative to the gimbal system of the gyroscope, is in driving contact with a driven clutch member spherical to the centre of rotation of the gimbals and secured to the inner gimbal or rotor mounting.

The clutch may comprise a single annular friction disc whose axis of continuous rotation is approximately normal to the driving member and which is movable so that any point of its driving surface may be brought into frictional point contact with the plate to exert a friction force, or several discs having their axes normal or otherwise to the driven member and to which individually varying clutch actuating forces may be applied to increase or decrease the resultant friction driving force exerted on the driven member. In the latter case the friction discs are preferably driven at the same constant speed and maintained continuously in driving contact with the driven member and changes in friction forces are made simply by changing the clutch actuating forces.

The precession torque applied to the gyroscope may be measured in terms of the clutch actuating forces applied or, preferably, by measuring the reaction to the friction forces in the or each clutch-disc shaft when the clutch actuating forces are applied, the total reaction being proportional to the torque. In the latter case, the measuring apparatus may comprise an element sensitive to the deflection of the or each shaft caused by the friction force reaction, such as an inductive pick-off, and preferably a spring is provided to co-act with the or each shaft to resist the reaction and thereby undergo a deflection which is proportional to the reaction in the shaft and measurable by the pick-off.

Conveniently, clutch actuating forces are applied electromagnetically, for example, by means of one or more rollers in contact with the non-driving face of the or each disc and borne in a pivoted arm movable in response to the energising of the magnets to bring each roller into heavier or lighter contact with its associated disc.

Figure 3A:
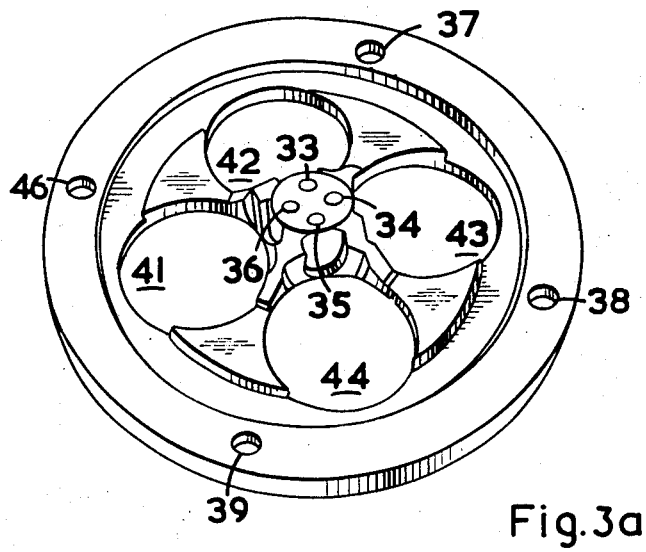
Figure 5:
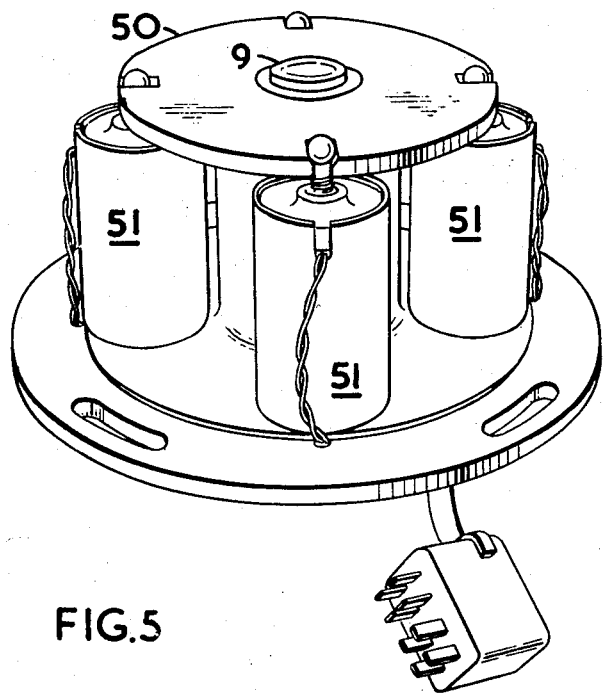
Figure 7:
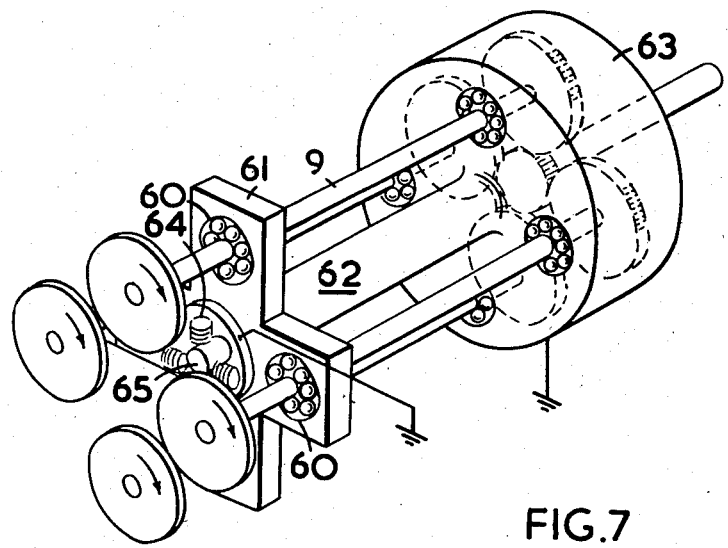
Figure 4:
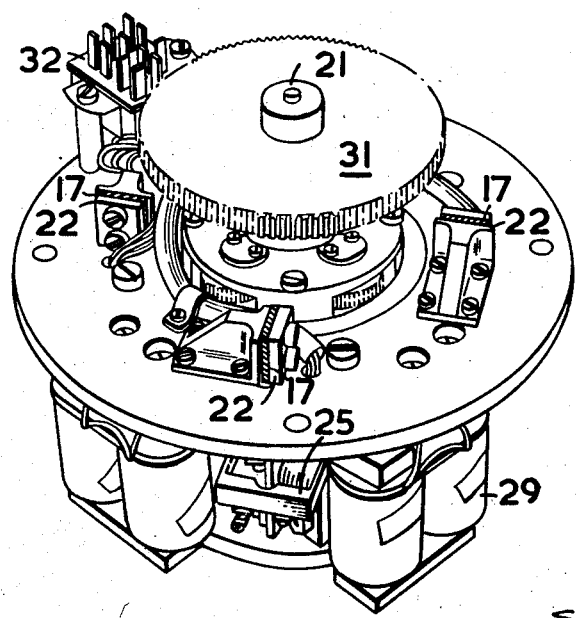
Figure 6:
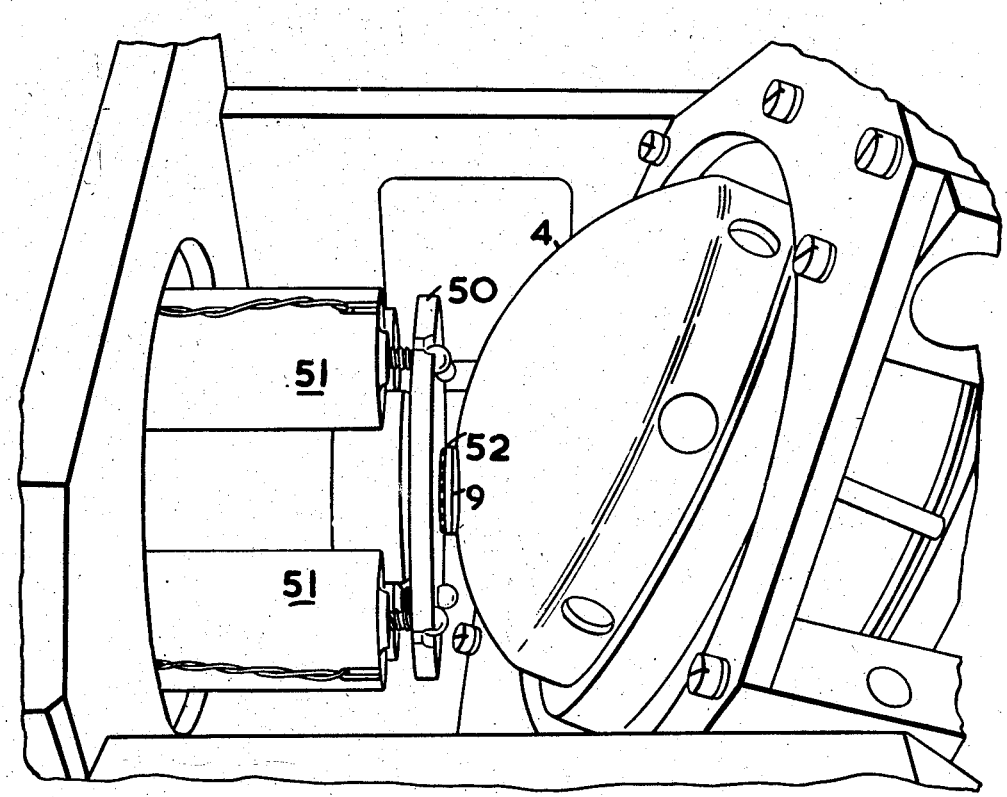

The invention will now be described with reference to the accompanying diagrammatic drawings in which:

Figure 1 is a perspective view of a first form of the invention showing the general arrangement of the gyroscope and clutch system, Figure 1a is an axial view of the clutch system of Figure 1, Figure 2 is an expanded perspective view of one clutch disc driving mechanism and associated shaft deflection measuring apparatus of the first form of the invention, Figure 3 is an end view of an assembly of four of the discs of Figure 2 with the associated apparatus, Figure 3a is cover plate of the apparatus of Figure 3, shown removed for convenience of illustration, Figure 4 is a view of the rear of the back plate of Figure 3, Figure 5 is a perspective view of a second form of the invention, Figure 6 is a view of the apparatus of Figure 5 with the clutch disc in contact with the clutch plate, Figure 7 is a perspective view of a third form of the invention, and, Figures 8 to 13 are diagrams to which reference is made in explaining the invention.

Referring to Figures 1 to 4, the gyroscope comprises a rotor 1 having its spindle 2 carried in a cylindrical frame 3 on which is mounted a smooth spherical clutch member 4 whose centre is the centre of rotation of the gimbal system indicated by the ring 5 and bearings 6, 6, 7, 7. Four mutually similar clutch discs 8 are mounted on shafts 9 with their driving faces in point contact at 10 with the member 4. The driving faces are outwardly bevelled rings of high friction material making point contact on the bevel with the member 4. They are driven at the same speed from a common drive shaft, not shown. In Figure 1a, the arrows show the direction of the friction forces generated when the discs 8 are in driving contact with the member 4.

In Figure 2, the rotary shaft 9 has a disc 8 mounted at one end and a gear wheel 19 fast on it at the other and is borne by ball bearings 11, 12. The bearing 11 is carried by an arm 13 secured at one end to a shaft 14 rotatable in bearings 15, 15, in the frame (not shown) of the apparatus and at the other end slidable in an arm 16 secured to a blade spring 17. The bearing 12 is secured on a spigot 18 secured to the frame and fits in a recess in the gear wheel 19. By this arrangement the bearing 12 and the gear wheel 19 are in the same plane so that the reaction in the shaft 9 to the friction forces generated when the clutch disc 8 is in driving contact with the member 4 is borne solely by the bearing 11 and undesirable bending forces are not imposed on the shaft. Both bearings allow the shaft 9 limited free axial movement. The gear wheel 19 meshes with a further gear 20 on a driven shaft 21 mounted in the frame of the apparatus. The gear teeth of the wheels 19, 20, are straight cut to permit the axial movement of the shaft 9.

The blade spring 17 is secured at 22 to the frame and at the other end 23 carries one part 24 of an inductive pickoff indicated generally at 25.

A pressure roller 26 mounted on an arm 27 pivoted in bearings 28, 28 carried in the frame of the machine is movable against the free face of the disc 8 under the influence of an electromagnet 29 to apply a clutch actuating force to the disc so bringing it into heavier or lighter contact with the member 4 as the case may be.

The arm 27 is under the constant load of the spring 40 which keeps the roller 26 in contact with the disc and the latter in contact with the member 4, and where four discs are employed, as in Figure 1, opposing pairs of springs are balanced so that no precession torque is applied to the gyroscope in the absence of a control signal.

Figure 3 shows an assembly of four of the discs 8, each with the associated apparatus shown in Figure 2, mounted on a back plate 30 like reference numerals indicating like parts. Figure 3a shows a cover plate for the apparatus of Figure 3. This plate has four holes 33, 34, 35, 36 as bearings for the ends of the shafts 14 and apertures 41, 42, 43, 44 for the clutch discs 8, and is held in the working position by screws passing through holes 37, 38, 39 and 40 into tapped holes 37a, 38a, 39a, 40a, respectively, in the base member 22. Figure 4 shows the other side of the back plate 30 and on it the spring mountings 22 and a primary driving gear wheel 31 secured to the shaft 21. A bank of electrical contacts 32 is also secured to the plate 30 for supplying the electromagnets 29 and taking out signals received from the pickoffs 25.

In operation, independent clutch actuating forces are applied to each of the discs 8 in accordance with signals which indicate a desired direction of precession of the gyroscope so that the precession torque applied, which is the vector sum of the frictional forces between the discs 8 and the member 4 is in a sense appropriate to the desired precession. A corresponding reaction occurs at the bearings 11 and 15 resulting in bending of the shaft 9 and a deflection of the spring 17, which is measured by the pickoff 25. The signals from the pickoff 25 are proportional to the precession torques.

In Figures 5 and 6, the apparatus shown comprises a single clutch disc 8' mounted on a swash plate 50 movable by the electromagnets 51 whereby the clutch actuating forces applied cause differential frictional contact between various points on the friction face of the disc 8' and the member 4. The disc 8' is mounted on a ball bearing 52. By applying different forces at each of the electromagnets the direction of the total clutch actuating force may be adjusted to apply a precession torque to the gyroscope in a sense appropriate to the desired precession.

In Figure 7 the apparatus shown is a modification of the apparatus of Figures 1 to 4, each of the disc driving shafts 9 being mounted on bearings 60 carried in a cross head member 61 integral with a resilient cantilever beam 62 of annular cross-section and mounted on the frame 63 which houses the disc shaft driving mechanisms. An inductive pickoff 64 is located in a circular aperture in the centre of the cross member 61 and comprises elements carried by the member 61 and other relatively movable elements on a central fixed arm 65. The pickoff is sensitive to deflection of the beam 62 in any direction and when clutch actuating forces are applied to the free faces of the discs the precession torque applied to the gyroscope is compounded mechanically into a single deflection of the beam 62. As the deflection of the beam will be caused by an eccentric force it will be accompanied by torsion and the pickoff 64 must be therefore insensitive to torsional deflection.

Figure 8:
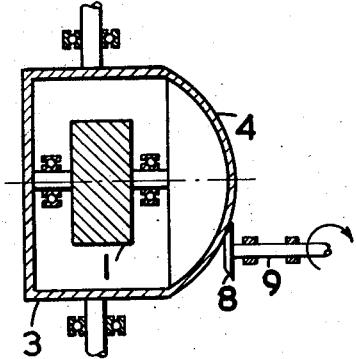
Figure 9:
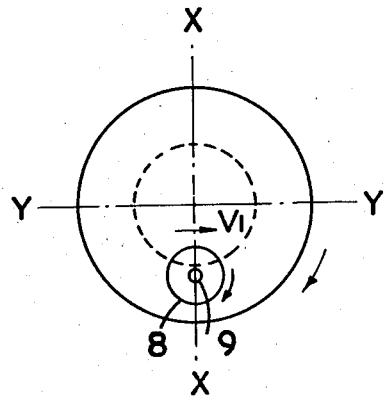

The application of the principle of compound sliding of which use is made in the present invention may be explained briefly as follows:

Referring to Figures 8 and 9 the clutch disc 8 in driving contact with the spherical member 4 generates a frictional force tangential to the member which exerts a couple about the $x, x$, axis and causes precession of the gyroscope about the $y, y$, axis.

Figure 11:
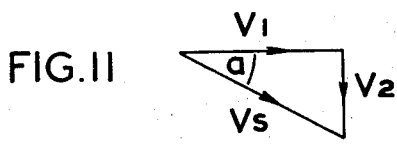
Figure 12:
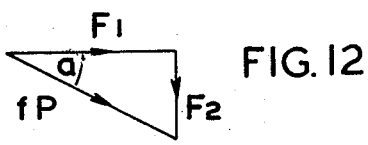

Referring now to Figures 11 and 12, let velocity $Vs$ be compounded from velocities $V_1$ and $V_2$ so that $$V_1 = Vs. \cos a$$
and
$$V_2 = Vs. \sin a$$

If a friction force $fP$ acts along $Vs$. it has component forces $F_1$ and $F_2$ in directions $V_1$ and $V_2$ respectively. Thus $$F_2 = fP \sin a = fP \cdot \frac{V_2}{\sqrt{V_1^2 + V_2^2}}$$

When $V_1 = O$, then $F_2 = fP$ but when lateral slip $V_1$ takes place $$F_2 = fP \frac{V_2}{\sqrt{V_1^2 + V_2^2}}$$

and if $V_1$ is much greater than $V_2$ $$F_2 = fP \frac{V_2}{V_1}$$

This effect is used in the apparatus of the invention.

Figure 10:
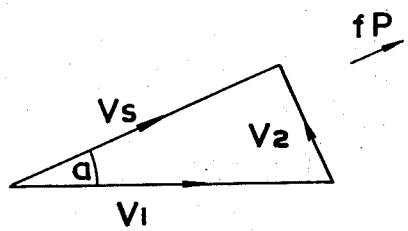

Referring now to Figure 10, if we assume:

$V_1^1$ = peripheral velocity of disc at point of contact.
$V_2^1$ = slip velocity due to precession of the gyroscope.
$Vs^1$ = resultant velocity of sliding.
$P^1$ = applied normal force at point of contact.
$Iw$ = angular momentum of the gyroscope.
$g$ = acceleration due to gravity.
$R$ = radius of spherical clutch member.
$f^1$ = coefficient of sliding friction.
$G$ = resulting angular precession rate.
$T$ = gyroscopic torque.
$a$ = angle of slip.

then $$T = \frac{Iw}{g} G$$

$$f^1 P^1 . R. = \frac{Iw.V_2}{g.R}$$

$$V_2^1 = \frac{f^1 P^1 . R^2 g}{Iw}$$

and $$\sin a = \frac{f^1 P^1 . R^2 g}{V_1^1 Iw}$$

If slip occurs between the member 4 and a friction disc 8 at the velocity $Vs^1$ under a force $P^1$ normal to the member 4 then a friction force $f^1 P^1$ is set up where $f^1$ is the coefficient of sliding friction between the two surfaces and is independent of $Vs^1$.

Figure 13:
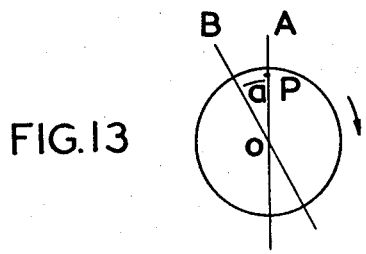

Referring to Figure 13, the velocities arising when the clutch disc 8 is in driving contact at the point P with the member 4 are shown by the vectors AO and BO which are separated by the angle $a$. In a perfect system, the precession resulting from a control force applied at P would always occur in the same direction, i. e. along the line AO.

However due to the compound slip, precession takes place along BO where angle AOB, or $a$, is the slip angle.

It will be seen that $\sin a$ is proportional to $f^1 P^1$ and therefore to the rate of precession demanded, but in practice this is a very small effect and may be neglected.

In one gyroscope embodying the invention, angle $a = 2°$ at a precession rate of 10°/sec.

In some applications, e. g. in aeroplanes, the clutch disc would move over the surface of the spherical clutch member with the pitching and yawing motions of the aeroplane and these motions are the only effects which might produce a significant increase in the angle $a$.

However if maximum rate of pitch and/or yaw is assumed to be 3 rad./sec. then in the example in which the radius of the member 4 was 3 inches a disturbing slip of approximately 9 in./sec., measured on the face of the member will occur.

It is likely that the largest increase in $a$ will occur when this disturbing velocity directly opposed the component of $V_1$ due to rotation of the clutch shaft in which case, in the example, $$\sin a = \frac{V_2^1}{wr - 9}$$

$wr$ being the component of $V_1$ due to the disc and $$V_2^1 = \frac{0.5}{15 - 9} = \frac{0.5}{6}$$

and angle $a = 5°$.

Thus the effect is still quite small and angle $a$ would have to approach 45° to seriously affect the stability of the apparatus.

Gyroscopic apparatus according to the invention, is simple, reliable, has very small inertia and, provided that slip between the clutch discs and the spherical plate is maintained, negligible undesirable precession torques are applied to the gyroscope.

Further, and with particular reference to the "directly coupled" apparatus, the precession torques which are generated are large enough to ensure accurate and rapid movement of apparatus so coupled to the gysoscope and are substantially constant at a given power input independent of the gimbal position of the gyroscopes. Also the torque/signal characteristic is continuous and approximately linear and the torques can be easily and accurately measured. Lastly, as the inertia of the gimbal system of the gyroscope is not substantially changed by the invention there is very little decrease in the nutation frequency of the gyroscope.

I claim:

1. In a free gyroscope having multiple gimbals including an inner gimbal, means for precessing said free gyroscope comprising, a driven clutch member having a spherical surface secured to the inner gimbal and positioned with its centre axis in axial alignment with the centre axis of rotation of the gyroscope gimbals, rotary clutch driving means having outwardly bevelled driving surfaces positioned normal to said spherical surface and in frictional contact therewith for driving said driven clutch member, stationary mounting means for said driving means positioned adjacent said gimbals, and means for continuously rotating said driving means whereby the driving means continuously contacts the driven clutch member in a slipping frictional engagement.

2. Apparatus as defined in claim 1 in which the driving means comprises a single friction disc, mounting means for said friction disc on the stationary mounting means permitting limited axial movement of the friction disc, and means for biasing said disc into contact with the driven member to bring any point of its bevelled driving surface into substantially point contact with the driven clutch member.

3. Apparatus as defined in claim 1 in which the driving means comprises a plurality of clutch driving members each of which is in the form of a disc, and means for applying varying clutch actuating forces to said discs individually whereby the instantaneous resultant of the friction forces between the discs and the driven member exerts an effective unidirectional friction driving force.

4. In the apparatus of claim 3, a mounting means for said plurality of disc driving members on said stationary mounting means for permitting limited axial movement of each of the driving members, said disc driving members mounting means maintaining their axes of rotation in fixed relation one to another, means for driving the discs at the same constant speed, means for applying variable clutch actuating forces to the discs individually whereby the resultant effective driving force is variable.

5. Apparatus as claimed in claim 4 comprising individual pressure rollers in contact with the discs and means for varying the pressure of each roller on its associated disc to vary the clutch actuating forces.

6. Apparatus as claimed in claim 5 wherein said last named means comprises electromagnetic means for varying the pressure of the rollers on the discs.

7. Apparatus as claimed in claim 5, in which the discs are supported by resilient shafts, each of which comprises an element sensitive to the resilient deflection caused by the friction force reaction and means for measuring the deflection which is a measure of the magnitude of the clutch actuating forces.

8. Apparatus as claimed in claim 7 comprising a spring operatively connected for deflection in step with and by the resilient shaft, and means for measuring the deflection of the spring.

9. Apparatus as claimed in claim 4 wherein said disc driving members mounting means include a resilient cantilever, a cross head on the cantilever, said disc driving members being mounted on shafts in bearings in the crosshead with their axes of continuous rotation of the shafts in constant relation one to another whereby on the application of clutch actuating forces the reactions to friction forces between each disc and the driven member deflects the shafts and also the cantilever.

10. Apparatus as claimed in claim 9 comprising individual pressure rollers in contact with the discs and means for varying the pressure of each roller on its associated disc to vary the clutch actuating forces.

11. Apparatus as claimed in claim 10 wherein said last-named means comprises electromagnetic means for varying the pressure of the rollers on the discs.

12. Apparatus as claimed in claim 10 comprising an element sensitive to the deflection of the cantilever and means for measuring the deflection which is a measure of the clutch actuating forces.

References Cited in the file of this patent

UNITED STATES PATENTS

| 1,096,253 | Lang | May 12, 1914 |
| 1,825,345 | Fieux | Sept. 29, 1931 |
| 2,559,298 | Hayes | July 3, 1951 |
| 2,592,582 | Lundberg et al. | Apr. 15, 1952 |

FOREIGN PATENTS

| 108,776 | Great Britain | Aug. 23, 1917 |